S. Richards,
Glass Mold.

N° 55,159.　　　　　Patented May 29, 1866.

Witnesses.　　　　　Inventor.
J. E. Shaw
Geo. Buckley　　　　Samuel Richards

UNITED STATES PATENT OFFICE.

SAMUEL RICHARDS, OF PHILADELPHIA, PENNSYLVANIA.

IMPROVED PROCESS FOR MANUFACTURING GLASS.

Specification forming part of Letters Patent No. 55,159, dated May 29, 1866.

*To all whom it may concern:*

Be it known that I, SAMUEL RICHARDS, of the city of Philadelphia and State of Pennsylvania, have invented a new and useful Process of Manufacturing Glass; and I do hereby declare that the following is a full and exact description of the same, reference being had to the annexed drawings, making a part hereof, in which—

Figure 1:
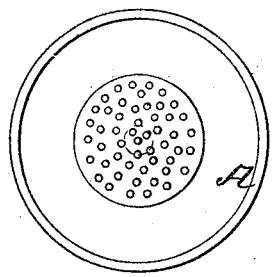
Figure 2:
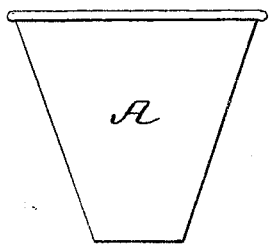
Figure 3:
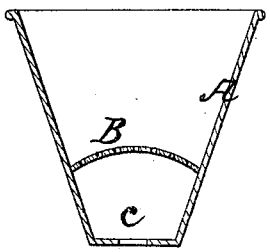

Figure 1 is a top view, Fig. 2 a side view, Fig. 3 a vertical section, of the pot or crucible used by me in connection with my process.

My process enables me to utilize the impure cullet and to use inferior fluxes—such as salt-cake, (sulphate of soda,) Glauber salts, common rock-salt, kelp, cryolite—in the manufacture of glass, and at the same time to produce glass of superior quality at greatly reduced cost when compared with the cost of producing glass without the aid of my process.

My process consists in first melting the cullet with the salt-cake or other inferior flux, and straining the impurities out of the glass while it is in a melted state, and then using the product of this first melt in the preparation of batches for the pots from which the glass-blowers take their glass.

In connection with a furnace of ordinary construction, I make use of pots made of pot-clay.

In the drawings, A represents one of these pots, each of them having a perforated false bottom, B, (also made of pot-clay,) and an aperture, C, through the bottom, this aperture being large enough to carry off the glass that is strained through the perforated bottom B.

Each of the pots is set in the furnace so that the apertures in the bottoms of the pots correspond with apertures leading down through the bench of the furnace, the furnace being built upon an arch, under which there is an open space, where a tank containing water is placed to receive the strained glass from the pots A.

The pots may be charged with refuse glass from the melting-furnaces without the addition of any flux, or they may be charged, if desired, with batch in which salt-cake, Glauber salts, kelp, cryolite, or any other inferior flux is used, in such proportions as will make the glass sufficiently liquid to run through the perforated bottoms of the pots. The products of this first melt may be then used in any proportion desired in preparing batches for the blower's pots.

A very small quantity, not exceeding twenty per cent., of ordinary batch added to the product of the straining-pots produces glass of the finest quality.

Having thus described my process, what I claim as new therein, and desire to secure by Letters Patent, is—

The manufacture of merchantable glass from impure cullet and common fluxes by first melting them and straining the impurities out of them, and then taking the product and mixing it with a small portion of ordinary batch, substantially as described.

SAMUEL RICHARDS.

Witnesses:
J. C. SHAW,
GEO. BUCKLEY.